Patented Oct. 10, 1950

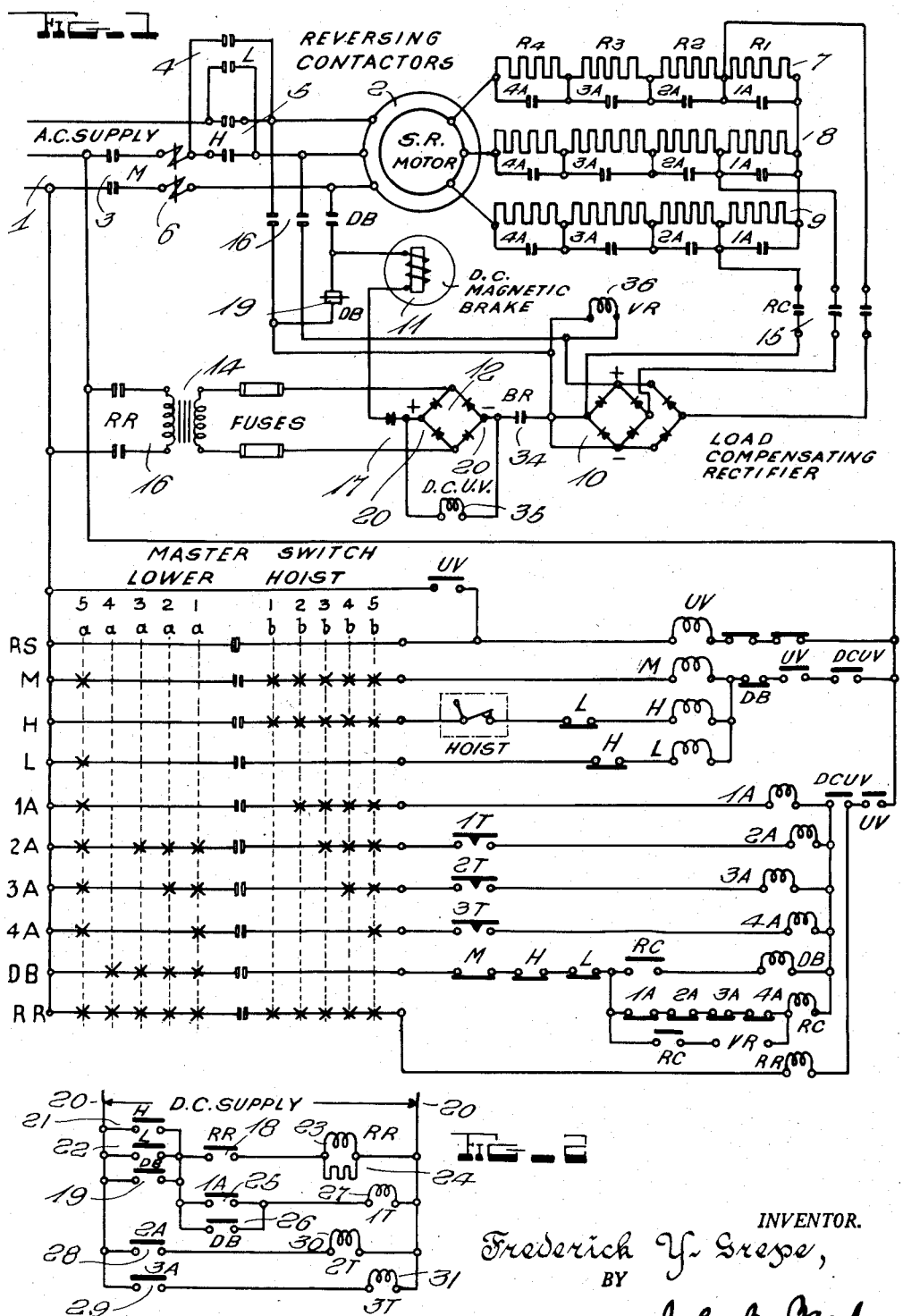

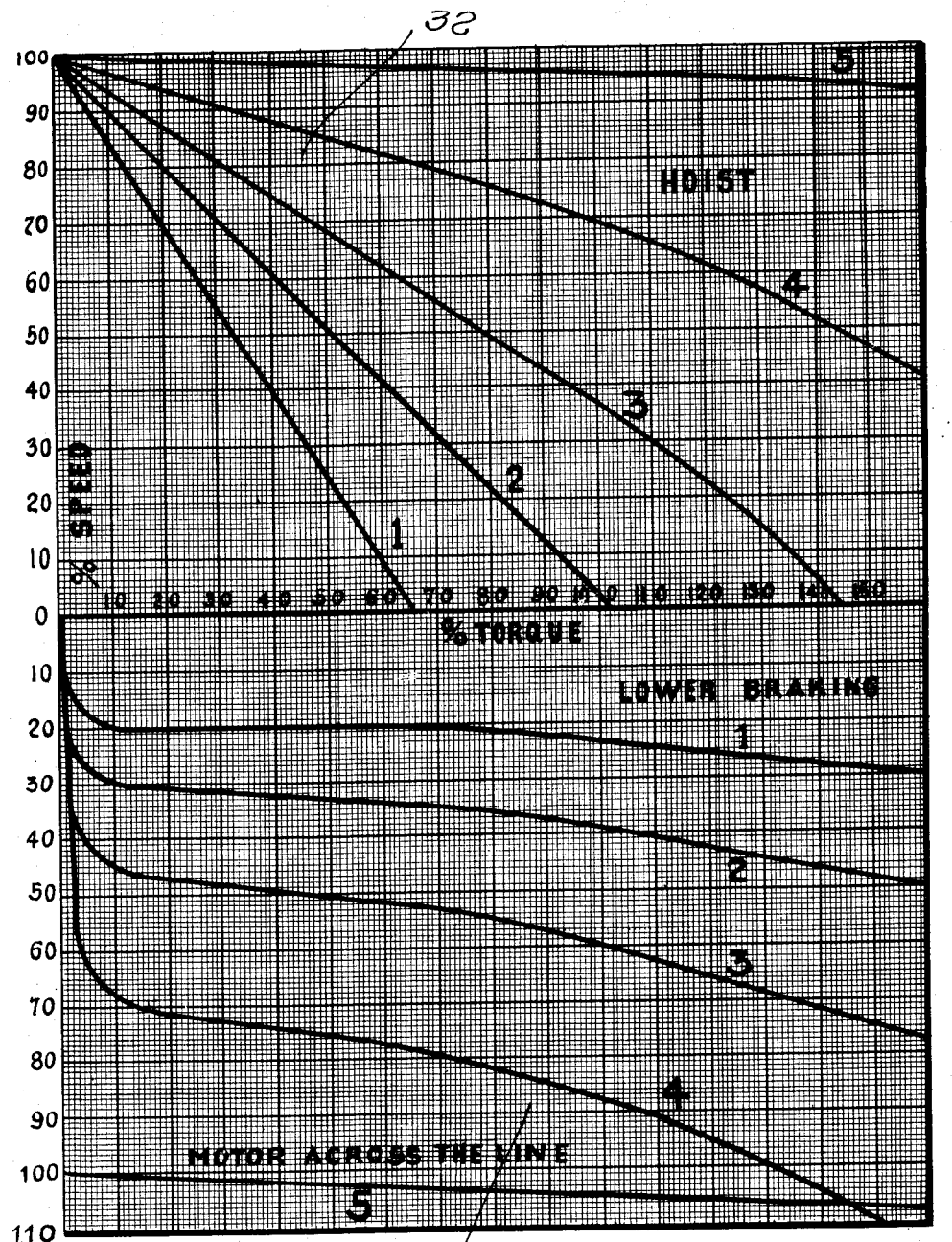

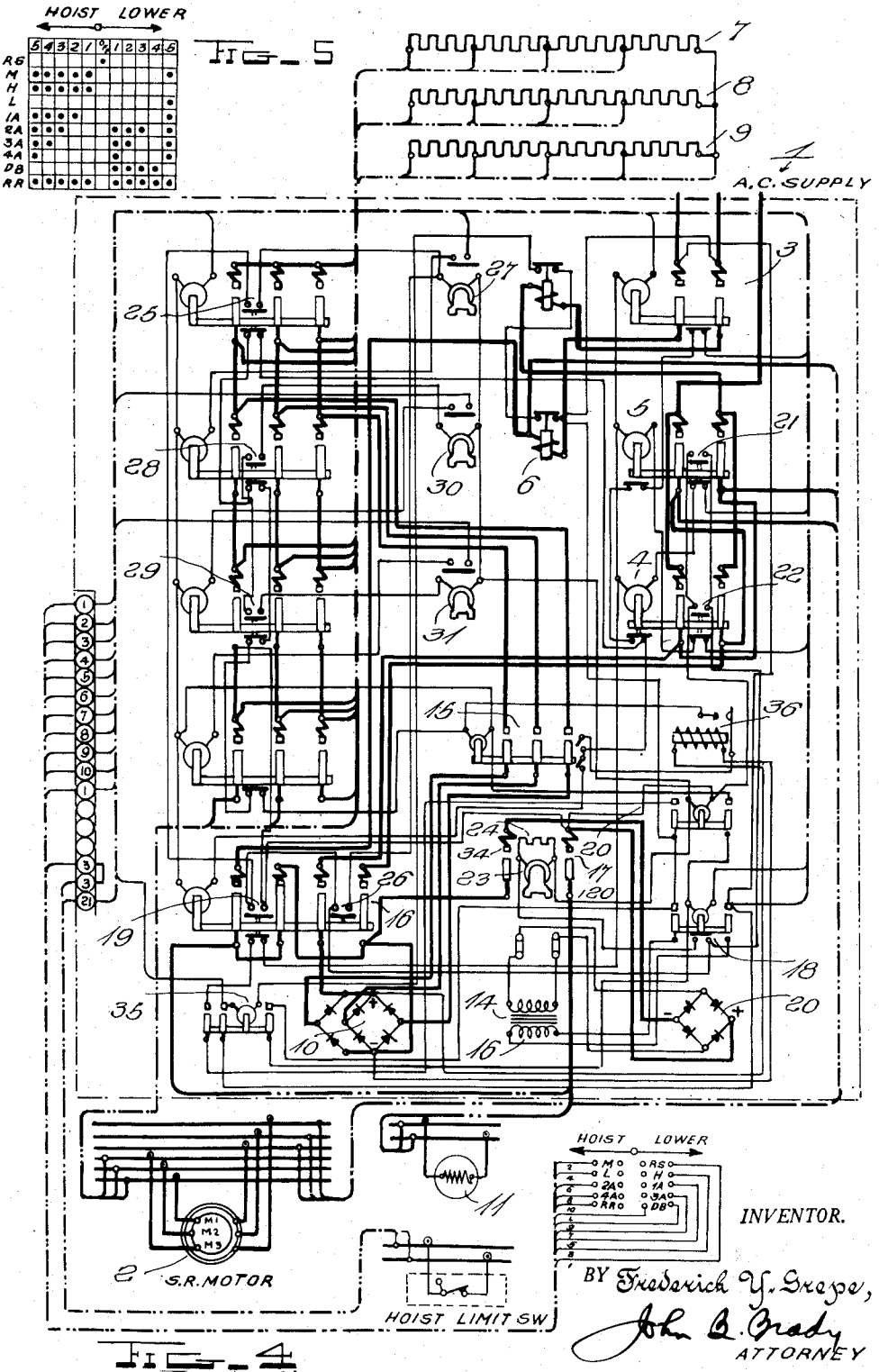

2,525,541

UNITED STATES PATENT OFFICE 2,525,541

AUTOMATIC LOAD COMPENSATION SYSTEM FOR ELECTRIC MOTORS

Frederick Y. Grepe, Toronto, Ontario, Canada, assignor to Canadian Controllers, Limited, Toronto, Ontario, Canada Application July 14, 1948, Serial No. 38,624

6 Claims. (Cl. 318—212)

1

My invention relates broadly to automatic load compensation for an alternating current wound rotor motor when driven as a generator by an overhauling load or external driving force.

One of the objects of my invention is to provide a circuit arrangement for automatic load braking compensation of alternating current wound rotor motors in which braking is effected electrically rather than depending wholly on mechanical braking.

Another object of my invention is to provide an improved method of electrically braking alternating current wound rotor motors.

Another object of my invention is to provide a hoisting or forward circuit arrangement for alternating current wound rotor motors with electrical dynamic braking effective in the lowering or overhauling (driven) operation and which braking is self adjusting so as to meet conditions of variable load.

A further object of my invention is to provide an electrical compensating system for motor circuits employing an alternating current wound rotor motor having direct current excitation, with means for automatically killing the system in the event of abnormal braking overload conditions.

Still another object of my invention is to provide an electrical braking circuit for alternating current wound rotor motors in which sectionalized resistances are arranged in the rotor circuit and are rendered selectively effective for adjusting the load in the rotor circuit proportionately with changes in the direct current excitation supply to the stator circuit.

Another object of my invention is to provide a current arrangement including a rectifier connected across a section of a sectionalized resistance arrangement in the rotor circuit in such a manner as to obviate the necessity of using transformers.

A further object of my invention is to provide a circuit arrangement for automatic load compensation of alternating current wound rotor motor operated equipment including a driving motor having both stator and rotor circuits, operated from an alternating current power supply, with sectionalized resistances arranged in the rotor circuits and rectifier circuits arranged in both the stator and rotor circuits in coacting relation to control the excitation of the stator proportionately with the load to which the rotor is subjected.

Still another object of my invention is to provide an arrangement of direct current magnetic brake connected in series with the stator winding of a driving motor and in compensated dynamic arrangement with respect to the rotor circuit of the driving motor.

A further object of my invention is to provide an automatic load compensation system for both the stator and rotor circuits of alternating current wound rotor motors in which a magnetic brake is electrically switched from circuit connections arranged for the motor driving to circuit connections with the motor stator winding and the load compensating rectifier with the motor arranged for compensated dynamic braking.

Other and further objects of my invention reside in an electrical dynamic braking system for alternating current wound rotor motors as set forth more fully in the specification hereinafter following by reference to the following drawings in which:

Figure 1 is a schematic and diagrammatic wiring diagram of the hoist motor control system of my invention; Fig. 2 is a circuit diagram of the timing circuit which may be associated with the rectifier system shown in Fig. 1 for supplying direct current magnetic brake circuit and the teaser supply; Fig. 3 illustrates typical speed/torque curves characteristic of the compensated dynamic braking system for hoist motors of the alternating current wound rotor type motor for crane hoist control equipped with the control system of my invention; Fig. 4 is a diagram showing the mechanical operating connections between the elements shown in the wiring diagram of Fig. 1; and Fig. 5 is a diagram showing the various positions of the hoist control switch used in the control system of my invention.

Referring to the drawings in detail the polyphase supply system 1 feeds hoist motor 2 through sets of contactors 3, 4 and 5, and overload relays 6. Contactors 4 and 5 are reversing contactors. Motor 2 is of the wound rotor type of alternating current motor. When contactors 3 and 5 are in, motor 2 is acting as a motor in the hoisting direction, but when lowering with an overhauling load, the hoist motor 2 may function as a generator.

Motor 2 is connected to a multiplicity of secondary resistors shown in circuits 7, 8 and 9 each of which are constituted by a plurality of sections including resistors R1, R2, R3 and R4 in each circuit. The corresponding sections in each circuit are simultaneously controlled by magnetically actuated contactors designated at 1A, 2A, 3A and 4A.

The compensating rectifier 10 is tapped across the section of resistance R1 at the neutral or low voltage end of the resistance bank through contactors 15.

The compensating rectifier 10 is connected back to the stator windings of the motor 2 through contactors 16, and serves to supply exciting current to the motor 2 to build the flux up to the demanded value. To provide the initial excitation to cause the motor 2 to generate and at the same time release the direct current magnetic brake 11, an auxiliary direct current supply is obtained in the instance shown from rectifier 12 through the brake contactor 17—34.

Rectifier 12 is energized from alternating current source 1 through contactors 18 and transformer 14. The several circuits are controlled magnetically by the contactors under the direct control of a hand operated master switch. The circuits and equipment which are controlled are designated as follows:

RS—Under voltage relay circuit
UV—Under voltage relay (alternating current)
M—Main line contactor circuit 3
H—Hoist contactor circuit 5
L—Lower contactor circuit 4
1A—Accelerating contactor circuits
2A—Accelerating contactor circuits
3A—Accelerating contactor circuits
4A—Accelerating contactor circuits
DB—Dynamic braking contactor circuit 16—19
RR—Controls the braking teaser circuit 12 and the automatic timing relays
DC—Control circuit connected at 20—20
BR—Brake contactor 17—34
RC—Rectifier contactor 15
DCUV—Under voltage relay 35 (direct current)
VR—Voltage relay 36 across compensating rectifier (for safety purposes)
1T—Timing relay 27
2T—Timing relay 30
3T—Timing relay 31

In the application of my invention to hoisting it will be observed that on all hoisting points of the controller the motor behaves purely as an induction motor. When lowering an overhauling load the purpose of the invention is to make the motor together with its correlated control act as an electric brake and to do this the stator windings are excited from a source of direct current power and the generated energy at the rotor terminals is absorbed in the secondary resistances. Furthermore, the control is such that the equipment automatically compensates itself for degrees of load thus preventing the load running away. In order to achieve this a comparatively small direct current supply is impressed on two phases of the motor and in series with the direct current brake winding 11 thus releasing the brake and exciting the motor simultaneously. As the motor begins to rotate voltage is fed from the slip rings through the resistors 7, 8 and 9 and contactor 15, to the compensating rectifier 10. Then from the output side of the compensating rectifier 10 the circuit leads to contactors 16—19 to the other stator phase of the motor. In doing this the stator excitation builds up until a balance is obtained between rotor output and stator input. This means that for any given load the amount of direct current taken from the load compensation rectifier 10 is automatically increased or decreased as the amount of rotor current varies. This feature insures that at no time can the flux produced by the rotor current wipe out the stator flux produced by the direct current field so causing a reduction in output torque and thereby permitting the load to drop. The action described is in the nature of a regenerative system inasmuch as the current in the rotor builds up to an automatically predetermined value by excitation from the rotor via the compensating rectifier 10 to the stator.

The secondary resistors in the circuits 7, 8 and 9 are in combination each constituted by a plurality of individual resistors which are separably capable of being shunted by the briding contactors under control of the controller system illustrated by the several successive contacting circuits illustrated in the lower portion of Fig. 1. As the hoist moves up or down the several circuits shown in the controller system are successively energized exciting the control windings which in turn successively control the circuits as illustrated.

In Fig. 2 I have shown the auxiliary direct current control circuit which is connected at 20—20 to the direct current magnetic brake circuit 11. This circuit includes the hoist auxiliary contacts 21, the lowering auxiliary contacts 22 and the dynamic braking auxiliary contactor circuit 19. This circuit as described is connected through one path which includes control relay contacts 18 and brake contactor winding 23 shunted by resistor 24. The circuit connects through another path which includes accelerating contactors 25 and 26 connected through the actuating winding 27 of the associated timing relay 1T. This circuit also includes the accelerating contactors 28 and 29 corresponding to contactors 2A and 3A respectively connected through the actuating windings 30 and 31 of the timing relays 2T and 3T respectively.

As illustrated in Fig. 3 the speed/torque curves for an alternating current wound rotor motor are considerably improved by use of the compensated dynamic braking of my invention, in the lowering or braking operation as represented in the series of curves shown at 33. Substantially flat characteristics are obtainable in the dynamic braking by use of the compensation provided by the system of my invention.

In Fig. 4 I have shown the relative mechanical arrangement of the elements of the circuit shown in Fig. 1, the parts being similarly numbered. The mechanical operating connections between the elements of the circuit have been illustrated to show the compact assembly of the parts.

Fig. 5 is a diagram showing the positions to which the hoist control switch may be moved in performing the several control functions through the circuit of Fig. 1.

I have found the circuit of my invention highly practicable in construction and operation and while I have disclosed my invention in one of its certain preferred embodiments I realize that modifications may be made and I intend no limitations upon my invention other than may be imposed by the scope of the appended claims.

What I claim and desire to secure by Letters Patent of the United States is:

1. A motor control system comprising in combination with a stator and rotor having alternating current wound stator and rotor circuits associated therewith, a sectionalized resistance load connected with said rotor circuit, a load compensating rectifier connected with said sectionalized resistance load, and means operated by said load compensating rectifier for dynamically braking said rotor according to increase in load current in said rotor circuit.

2. A motor control system comprising in combination with a stator and rotor having alternating current wound stator and rotor circuits associated therewith, a sectionalized resistance load connected with said rotor circuit, a load compensating rectifier connected with said sectionalized resistance load, and means operated by said load compensating rectifier for controlling the current input to said stator circuit in proportion to the loading of said rotor circuit.

3. In an alternating current motor system including a power excited stator system and a wound rotor connected to a sectionalized resistance load, the method of dynamically braking the motor system which comprises exciting a portion of the stator system by a direct current obtained from the main alternating current supply system, supplying a resistive load from the power generated by associated rotor, rectifying a selected portion of the current supplied to the resistive load from the rotor and controlling by said rectified current the excitation of the stator system and so constituting an automatic and powerful feed back system.

4. A motor control system comprising in combination with an alternating current source, a stator and rotor, a circuit connected with said stator, a circuit connected with said rotor, a sectionalized resistance load selectively connected with said rotor circuit, means for deriving a direct current from a portion of said alternating current source, means for initially exciting a portion of said stator circuit from said direct current, said rotor operating to generate and deliver alternating current to said rotor circuit, means for deriving a direct current from a selected portion of the alternating current generated and delivered by said rotor, and means for regeneratively coupling said circuits.

5. A motor control system comprising in combination with an alternating current source, a stator and rotor, a circuit connected with said stator, a circuit connected with said rotor, a sectionalized resistance load selectively connected with said rotor circuit, a rectifier connected with a portion of said alternating current source for deriving direct current therefrom, circuit connections from said rectifier to a portion of said stator circuit for exciting said portion of said stator circuit from said direct current, said rotor operating to generate and deliver alternating current to said rotor circuit, a separate rectifier for deriving a direct current from a selected portion of the alternating current generated and delivered by said rotor, and means for regeneratively coupling said circuits.

6. A motor control system comprising in combination with an alternating current supply source, a stator and rotor, a circuit connected with said stator, a circuit connected with said rotor, a resistance load having a multiplicity of taps distributed therethrough and connected with said rotor circuit; a compensating rectifier connected with certain of the taps in said resistance load, connections from the output circuit of said compensating rectifier with said stator circuit; a separate rectifier for deriving direct current from a portion of said alternating current supply source, said rectifiers coacting to supply mutually regenerating currents for sustaining a feed back condition through said stator and rotor circuits.

FREDERICK Y. GREPE.

REFERENCES CITED

The following references are of record in the file of this patent:

UNITED STATES PATENTS

| Number | Name | Date |
| --- | --- | --- |
| 1,781,792 | Rodman | Nov. 18, 1930 |